United States Patent [19]

Onal

[11] Patent Number: 4,650,782

[45] Date of Patent: Mar. 17, 1987

[54] LEAD-TOLERANT CATALYST FOR TREATING EXHAUST GAS IN THE PRESENCE OF $SO_2$

[75] Inventor: Isik Onal, Arlington Heights, Ill.

[73] Assignee: Allied Corporation, Morristown, N.J.

[21] Appl. No.: 842,509

[22] Filed: Mar. 21, 1986

Related U.S. Application Data

[63] Continuation-in-part of Ser. No. 673,815, Nov. 21, 1984, abandoned.

[51] Int. Cl.$^4$ .................. B01J 21/04; B01J 21/06; B01J 23/40; B01J 23/48
[52] U.S. Cl. .................. 502/339; 502/325; 502/332; 502/333; 502/334; 502/344; 502/347; 502/348; 423/213.5
[58] Field of Search .............. 502/325, 332, 333, 334, 502/339, 344, 347, 348; 423/213.5

[56] References Cited

U.S. PATENT DOCUMENTS

| | | | |
|---|---|---|---|
| 3,873,469 | 3/1975 | Foster et al. | 502/242 |
| 3,931,050 | 1/1976 | Asano et al. | 502/334 |
| 4,350,613 | 9/1982 | Nishino et al. | 252/455 R |
| 4,351,811 | 9/1982 | Matsuda et al. | 423/239 |

*Primary Examiner*—W. J. Shine
*Attorney, Agent, or Firm*—Thomas K. McBride; John F. Spears, Jr.; Thomas J. Filarski

[57] ABSTRACT

A lead-tolerant exhaust gas oxidation catalytic composite for oxidizing gas in the presence of $SO_2$ comprising a refractory inorganic oxide support material having deposited thereon a noble metal component and having dispersed thereon a protective coating of titania. The refractory support material may be deposited with a noble metal and thereafter applied as a washcoat on a low surface area support matrix followed by a titanium washcoat superimposed thereover. Also, a method for treating exhaust gases containing lead components by contacting the exhaust gas with the catalytic composite is disclosed.

10 Claims, No Drawings

4,650,782

LEAD-TOLERANT CATALYST FOR TREATING EXHAUST GAS IN THE PRESENCE OF SO$_2$

CROSS-REFERENCE TO RELATED APPLICATION

This application is a continuation-in-part of prior copending application Ser. No. 673,815 filed Nov. 21, 1984, now abandoned.

BACKGROUND OF THE INVENTION

The present invention relates to a lead-tolerant catalyst composition and method for oxidizing exhaust gas containing lead compounds prior to discharging the exhaust gas into the atmosphere. The catalyst composition of the present invention exhibits enhanced stability as a result of resistance of lead poisoning when effecting the conversion of auto exhaust gases or other lead-containing exhaust gas streams of a noxious nature.

Gaseous waste products resulting from the combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. While exhaust gases from other carbonaceous fuel-burning sources, such as stationary engines, industrial furnaces, etc., contribute substantially to air pollution, the exhaust gases from automotive engines are a principal source of pollution. In recent years, with the ever growing number of automobiles powered by internal combustion engines, the discharge of pollutants therefrom has been of increasing concern, particularly in urban areas where the problem is more acute, and the control thereof has become exceedingly important. Of the various methods which have been proposed for converting carbon monoxide, hydrocarbon and nitrogen oxide pollutants to innocuous products, the incorporation of a catalyst converter in the exhaust system of an internal combustion engine holds the most promise of meeting the increasingly rigid standards established for automotive vehicles by the responsible governmental authorities.

In order to achieve the conversion of carbon monoxide in hydrocarbon pollutants, it has become the practice to employ catalysts in conjunction with air-to-fuel ratio control means which function in response to a feedback signal from an oxygen sensor in the engine exhaust system. The air-to-fuel ratio control means is typically programmed to provide fuel and air to the engine at a ratio conducive to a near stoichiometric balance of oxidants and reductants in the hot exhaust gases at engine cruising conditions, and to a stoichiometric excess of reductants at engine idling and acceleration conditions. The result is that the composition of the exhaust gases with which the catalyst is contacted fluctuates almost constantly, such that conditions to which the catalyst is exposed are alternatively net-reducing and net-oxidizing. A catalyst for the oxidation of carbon monoxide and hydrocarbons must be capable of operating in such a dynamic environment.

Aside from problems of operating environment, exhaust gas oxidation catalysts are often subject to contamination by contact with poisoning constituents which act to decrease the catalyst's ability to convert noxious components. For example, it has become common practice to add to automotive gasolines certain anti-knock compounds. These compounds often act as catalyst poisons for automotive exhaust oxidation catalysts employed for the conversion of hydrocarbons, and CO in automotive exhaust gases. Typical of the anti-knock compounds which pose the greatest potential for poisoning exhaust catalysts are alkyl lead compounds. Lead compounds which are the combustion products of the alkyl lead anti-knock component exit the engine with the exhaust gas. When the lead containing exhaust gas is contacted with the exhaust gas catalyst, lead is deposited on the catalytically active sites of the catalyst thereby causing deactivation. After long exposure to exhaust gases containing lead compounds the exhaust gas catalyst becomes substantially inactive and incapable of performing its intended functions.

Two alternative solutions exist for coping with this poisoning of exhaust gas catalyst. The first alternative is to eliminate the poisons from the exhaust prior to contact with the catalyst. In the case of lead compounds in automobile exhaust gases this has been achieved by eliminating alkyl lead compounds as anti-knock components of gasoline. Unfortunately, the elimination of lead-based anti-knock compounds has resulted in an overall increase in the cost of gasoline. This is because the displacement of lead anti-knock compounds has been compensated for by the additional blending of high octane components into gasoline in order to meet octane requirements. Producing high octane components such as benzene, toluene, and xylenes requires expensive and elaborate refining techniques, typically catalytic reforming. All in all these added steps act to increase the cost of gasoline. A second and more desirable alternative to removing lead-based anti-knock compounds would be to develop a lead-tolerant exhaust gas oxidation catalyst. Such a catalyst should be able to maintain high exhaust gas oxidation activity despite long term exposure to exhaust gases containing lead compounds. Such a catalyst would allow continued use of lead-containing anti-knock compounds thereby reducing the cost of gasoline while assuring the continued viable oxidation of the noxious exhaust gas components.

OBJECTS AND EMBODIMENTS

Accordingly, it is an object of the present invention to provide an exhaust gas oxidation catalyst composition capable of maintaining catalytic activity for the combustion of noxious exhaust gas components despite exposure to lead-containing compounds. A corollary object is to provide a method of oxidizing a lead-containing exhaust gas which assures improved exhaust gas catalyst life. In a broad embodiment then the present invention comprises a lead-tolerant exhaust gas oxidation catalyst composition for oxidizing exhaust gas in the presence of SO$_2$ comprising a refractory inorganic oxide support material having deposited thereon a noble metal component and having dispersed thereover a protective coating of titania.

In an alternative embodiment the invention provides a method of oxidizing an exhaust gas comprising CO, hydrocarbons and lead compounds comprising contacting said exhaust gas in the presence of SO$_2$ with a catalyst comprising a noble metal on a refractory inorganic oxide and having a protective coating of titania superimposed thereover.

These as well as other objects and embodiments will become more apparent after a more detailed description of the invention.

INFORMATION DISCLOSURE

Lead-tolerant catalyst systems have been disclosed in the art. For example, U.S. Pat. No. 3,259,453 discloses a lead-tolerant exhaust gas catalyst comprising mangano-chromia-manganite oxides, chromites, and manganites of copper, iron, cobalt, nickel, cadmium, zinc, bismuth, cerium, and also may comprise platinum, rhodium, palladium and ruthenium. Additionally, the catalyst of the reference contains lead scavengers which can comprise sulfates of ammonia, sodium, potassium, lithium or magnesium. The support for the catalyst may comprise titania and titania may be interspersed with the catalytic metals to inhibit agglomeration. U.S. Pat. Nos. 3,236,783 and 3,272,759 disclose catalysts related to that of U.S. Pat. Not. 3,259,453, the use of titania being substantially the same.

U.S. Pat. No. 3,378,334 discloses a catalyst comprising platinum on a high surface area refractory support such as alumina. The reference broadly discloses that the support may contain up to about 30% by weight of alumina of refractory components additional to the alumina which may impart an acid function to the catalyst such as zirconia or titania. It is further broadly indicated that the undesirable vehicular exhaust gas products may include various oxides of nitrogen and sulfur.

U.S. Pat. No. 3,873,469 discloses a platinum on titania exhaust gas catalyst at the paragraph bridging columns 7 and 8. This reference, however, does not apparently recognize that the lead tolerance of such a catalyst may be enhanced in the presence of $SO_2$. Likewise U.S. Pat. No. 3,922,235 discloses a $NO_X$ reduction catalyst. The catalyst comprises ruthenium interacting with a support of titania.

Also of interest is U.S. Pat. No. 4,350,613. This reference discloses an exhaust gas oxidation catalyst which comprises a platinum group metal or metal oxide capable of oxidizing reductive gases deposited on a support substantially composed of calcium aluminate and titanium oxide. The titanium oxide may be incorporated into a solid mass of calcium aluminate or it may be applied as a dispersion on top of the solid mass. The reference does recognize beginning at column 3, line 37, that titanium oxide is resistant to sulfur poisoning. Likewise U.S. Pat. No. 4,351,811 in the paragraph briding columns 4 and 5 recognizes that titanium oxides are resistant to sulfur oxides and, therefore, are advantageously employed as the major constituents in catalysts for reducing $NO_X$ in exhaust gas. It is further indicated that such catalysts may also contain Group VIII metals. The reference is, however, silent in regard to such a catalyst's resistance to lead poisoning.

U.S. Pat. No. 4,369,132 also describes an exhaust gas combination catalyst which comprises a titania support with a plurality of platinum-family elements selected from the group consisting of Pt-Pd, Pt-Rh, and Pt-Pd-Rh containing over 50 weight % of Pt. Such catalyst is disclosed as excelling in exhaust gas purification at low temperature. The reference makes no disclosure as to the lead tolerance of such a catalyst.

A further reference is of interest in the present discussion. This is U.S. Pat. No. 3,983,052. This reference discloses a procedure for regenerating lead-poisoned emission control catalyst. The procedure requires extraction of lead sulfate deposits with an aqueous ammonium salt solution. Thereafter the catalyst is subjected to exposure to $SO_2$ or $SO_2$ and air at 300° to 700° C. until other lead contaminants are substantially converted to lead sulfate. The catalyst is then subjected to a further washing step with an aqueous ammonium nitrate salt solution. This procedure is taught for use in regenerating lead-contaminated catalysts comprising nickel, palladium, rhodium, platinum, or combinations thereof as active components on bases of alumina. The reference, however, does not disclose the novel catalyst system of the instant invention.

Finally, U.S. Pat. No. 3,931,050 discloses a catalyst comprising a monolithic carrier, a layer of active refractory metallic oxide such as gamma-alumina, a first layer of deposited metal such as platinum and a layer of refractory coating such as gamma-alumina free from catalytic metal deposited as an outermost layer upon the first layer of deposited metal. Patentee, however, does not disclose the use of titania as a refractory overcoating.

In summary then, although the art has been cognizant of noble metal, titania-containing catalysts for treating exhaust gases, no reference has disclosed the catalytic composite of the instant invention which comprises a noble metal component on a refractory inorganic oxide and having a protective coating of titania superimposed thereover. Moreover, the art does not disclose the novel method of oxidizing an exhaust gas comprising CO, hydrocarbons and lead compounds comprising contacting said exhaust gas in the presence of $SO_2$ with a catalyst comprising a noble metal on a refractory inorganic oxide and having a protective coating of titania superimposed thereover.

DETAILED DESCRIPTION OF THE INVENTION

As heretofore indicated the lead-tolerance exhaust gas oxidation catalyst comprises a noble metal component on a refractory inorganic oxide and having a protective coating of titania superimposed thereover. It is to be understood that the refractory inorganic oxide support may be used advantageously in accordance with this invention in any configuration, shape, or size which exposes a catalytically effective amount of the noble metal components disposed thereon to the gas to be treated. The choice of configuration, shape and size of the support depends on the particular circumstances of use of the method of this invention. Generally, in operations in which the catalytic composite is disposed in a fixed bed in an immobile vessel, the support can be conveniently employed in particulate form, as pills, pellets, granules, rings, spheres, etc. Particulate form is especially desirable for large volumes of catalytic composite, and for use in circumstances in which periodic replacement of the catalytic composite may be desired. In circumstances in which less mass is desirable or in which movement or agitation of particles of refractory inorganic oxide may result in attrition, dusting, and resulting loss of disposed metals or undue increase in pressure drop across the particles, a monolithic structure is preferred. In automobile exhaust gas applications and in other applications where dimensional or structural stability is particularly desired, a monolithic refractory inorganic oxide structure is preferred. In preparing a monolithic structure of refractory inorganic oxide, it is usually most convenient to employ the oxide disposed as a thin film or washcoat on an inert carrier material which provides the structural support for said oxide washcoat. The inert carrier material can be any refractory material. It is preferred that the carrier material be unreactive with the refractory inorganic oxide support and titania and with the gas to which it is exposed. Ceramic materials are a preferred class of carrier material. Examples of suitable ceramic materials include sillimanite, petalite, cordierite, mullite, zircon, zircon mullite, spodumene, alumina-titanate, etc. The carrier material can best be utilized in any rigid unitary configuration which provides a plurality of pores or channels therethrough extending in the direction of gas flow. It is preferred that the carrier material be a honeycomb configuration. The carrier material can be used advantageously in either unitary form, or as an arrangement of multiple modules. The carrier material can be oriented such that gas flow is generally in the same direction as the cells or channels of the carrier material, or the gas flow through the carrier material in a transverse or radial manner. For a more detailed discussion of monolithic structures, refer to U.S. Pat. No. 3,767,453. The carrier material may also be made of any metal (including alloys) such as those disclosed in U.K. Patent Application 2,013,517 which can be fabricated into the desired form (e.g. honeycomb), are oxidation resistant and are otherwise capable of withstanding high temperatures.

The surface area of the material comprising the monolithic structure is not critical to the method of this invention. It is preferred that the micropore volume of the material be relatively low, and it is especially preferred that the material have a macropore distribution such that at least about 90% of the pore volume is in pores having a diameter of greater than about 2000 Angstroms. The surface area of the monolithic structure, as opposed to the material of which the structure is made, should be maximized consistent with pressure drop limitations for the particular application of the catalytic system of this invention. It is preferred that the surface area of the monolithic structure be from about 50 to about 1000 square meters per liter of structure, as measured by $N_2$ adsorption, where the volume of the structure is measured by its exterior dimensions. The geometric surface area of the monolithic structure, in terms of cell density, should be maximized consistent with pressure drop limitations, and is preferably in the range from about 200 to about 800 cells per square inch of cross-sectional area of the structure.

As heretofore set forth the noble metal component is supported on a refractory inorganic oxide. Any suitable refractory inorganic oxide may be utilized and many are known in the art to have beneficial use in the oxidation of exhaust gases. These include titania, zirconia, alumina, silica, ceria, lanthina, or mixtures of these. Alumina is especially preferred. Because of this preference the following discussion of the invention will be made with specific reference to alumina; however, it is to be understood that other refractory inorganic oxides may be utilized in place of alumina. The description with reference to alumina is merely for convenience.

The alumina catalyst washcoat support can be deposited on the monolithic carrier by any conventional or convenient means. Typical of such means is by dipping the carrier in an alumina-containing slurry. It is preferred that the alumina washcoat deposit be in the form of a film of from about 0.0003 to about 0.01 inches thick. It is also preferred that the alumina be present on the monolithic support in amounts in the range from about 400 g per cubic foot of carrier to about 10,000 g per cubic foot of carrier, where the volume is measured by the exterior dimensions of the monolithic carrier structure.

Irrespective of the exact method of employing the alumina catalytic support material, the catalyst composite of the present invention comprises a noble metal component supported on the alumina. Noble metal components which may be used in the present invention include a platinum component, an iridium component, a rhodium component, a palladium component, a silver component, a gold component, and/or mixtures of these metal components. In addition to a noble metal component the catalyst may have dispersed on the alumina catalytic support other metallic components which may act as stabilizers and/or interspersants which are well known in the art. Typical of such stabilizers and/or interspersants are the lanthanide series metals. Particularly well known stabilizers of these series include lanthanum and/or cerium. Additionally, other components known to be beneficial in the oxidation of automotive exhaust gases may be present in the catalyst of the instant invention.

Irrespective of the exact noble metal component or mixtures of components employed in the present invention and irrespective of any interspersants and/or stabilizers which may be employed in the catalyst system of the present invention, the noble metal component may be incorporated into the alumina catalytic support in any suitable manner. Such methods of an incorporation as coprecipitation, cogelation, ion exchange, or impregnation by soaking, dipping, immersion, or otherwise, may all be employed although not with equal results. The preferred method of incorporating the noble metal component into the alumina catalytic support involves the utilization of a soluble, decomposable compound of the particular noble metal component for impregnation of the alumina catalytic support in a relatively uniform manner. For example, a platinum component and/or a palladium component may be added to the alumina by commingling the latter with an aqueous solution of chloroplatinic and/or chloropalladic acid. The chloroplatinic acid and chloropalladic acid can be in common aqueous solution, or in separate aqueous solutions. In the latter case, in instances in which both a platinum and a palladium component are desired, the commingling of the alumina with the solutions can be performed sequentially in any order. Other water-soluble compounds or complexes may be employed in impregnation solutions and include ammonium chloroplatinate, bromoplatinic acid, platinum trichloride, platinum tetrachloride hydrate, platinum dichlorocarbonyl dichloride, dinitrodiamine platinum, sodium tetranitroplatinate, palladium chloride, palladium nitrate, palladium dioxide, diamminepalladium hydroxide, and tetramminepalladium chloride.

Utilization of a platinum or palladium chloride compound, such as chloroplatinic or chloropalladic acid or iridium trichloride hydrate, is ordinarily preferred. Hydrogen chloride, nitric acid, or the like acid can be added to the solution in order to further facilitate the uniform distribution of the metallic components throughout the alumina support material. In addition, it is generally preferred to dispose the noble metal component on the alumina support material after it has been calcined in order to minimize the risk of washing away the valuable noble metal compounds; however, in some cases it may be advantageous to dispose the noble metal component on the alumina when it is in a gelled state.

Likewise, when a rhodium component is incorporated with the alumina support, typically in connection with a process for purifying leaded fuel exhaust gas, the rhodium component may be added to the alumina support by commingling the latter with an aqueous solution of rhodium trichloride. Other water soluble compounds or complexes of rhodium may be employed, such as hexamminerhodium chloride, rhodium carbonylchloride, rhodium trichloride hydrate, rhodium nitrate, sodium hexacylororhodate, and sodium hexanitrorhodate.

Further, when an iridium component is incorporated into the catalyst, the iridium component may be added to the alumina support by commingling the latter with an aqueous or anhydrous alcoholic solution of iridium salts such as $H_2IrCl_6$, $H_3IrCl_6$, $HIrCl_2(OH)_2$, $(NH_4)_3IrCl_6$, $(NH_4)_2IrCl_5(H_2O)$, $[Ir(NH_3)_4Cl_2]Cl$, $[Ir(NH_3)_5(H_2O)]Cl_3$.

When the noble metal-alumina catalytic composite is deposited upon a monolithic structure as heretofore described the noble metal component loading is such that it ranges from about 10 g per cubic foot of support matrix monolith to about 100 g per cubic foot cubic of support matrix monolith. When the noble metal catalytic components are supported in another manner, such as upon pellets comprising alumina, the components are incorporated in amounts ranging from about 0.1 to 4 wt. % based on the weight of the alumina pellets.

The protective coating of titania can be deposited on the catalytic composition of the present invention by any suitable means. If the catalyst is in the form of pellets the titania may be impregnated into the pellets. If the catalyst is to be supported on a monolithic carrier structure the protective coating of titania may be applied as a washcoat in the form of a thin film of from about 0.003 to about 0.01 inches thick. This washcoat may be applied to the monolithic structure by dipping the support structure containing the noble metal on alumina in a titania-containing slurry. It is preferred that the titania be present on the monolithic support in amounts in the range of from about 400 g per cubic foot of carrier to about 10,000 g per cubic foot of carrier, where the volume is measured by the exterior dimensions of the monolithic carrier structure.

As heretofore indicated, the catalytic composite comprising noble metals on alumina with a protective coating of titania superimposed thereover and, if desired, a monolithic support structure, may be used in a converter or a reactor of through-flow, cross-flow, or radial-flow design installed in the exhaust line of an internal combustion engine. The converter or reactor may be employed in series with a subsequent oxidation converter or reactor with combustion air being injected ahead of the oxidation converter to ensure conversion of the residual carbon monoxide and hydrocarbons remaining in the exhaust gases.

Irrespective of the exact configuration of the converter or reaction zone, a further essential feature of the present invention is the presence of $SO_2$ in the reaction zone. It is believed that the $SO_2$ in the exhaust gas undergoes further oxidation to $SO_3$ at the conditions within the reaction zone and in the presence of a noble metal component. Thereafter the $SO_3$ is reacted with lead to form $PbSO_4$. It is believed that the reaction of the lead with $SO_3$ takes place at the site of the noble metal component. Accordingly, it appears that the $PbSO_4$ has a less deleterious effect on the noble metal component oxidation function than does lead itself. Moreover it is believed that $PbSO_4$ has an oxidation function in and of itself. Although this oxidation function is probably not as important as the oxidation function of the noble retal component, the presence of the $PbSO_4$ acts to minimize the adverse effect of lead contamination of the exhaust gas oxidation catalyst. Accordingly, it is believed that the presence of $SO_2$ in the reaction zone is essential in achieving the increased lead contamination tolerance of the catalyst composition of the present invention. In the prior art catalyst compositions, when alumina is present in the catalyst support $Al_2(SO_4)_3$ preferentially forms at the thermodynamic conditions within the exhaust gas oxidation reaction zone. This has two adverse results. First, formation of $Al_2(SO_4)_3$ consumes $SO_2$ that might otherwise be available to form the more desirable $PbSO_4$. Secondly, formation of $Al_2(SO_4)_3$ results in a decrease in the catalyst support surface area and the commensurate loss of catalyst activity. In the present catalyst composition these problems are overcome by supporting the noble metal component on alumina and superimposing thereover a protective coating of titania. The formation of $TiOSO_4$ is not thermodynamically favored at the high temperature, typically 430° to about 600° C. which exists in the reaction zone. This results in the $SO_2$ being available to react with the lead components to form $PbSO_4$.

In the present invention the $SO_2$ may be derived from an external source. Alternatively, when the catalyst of the present invention is employed to oxidize the exhaust gas of an automotive vehicle the $SO_2$ may be generated within the internal combustion engine from sulfur-containing compounds in the fuel. $SO_2$ would then pass with the exhaust gases into the reaction zone. The amount of $SO_2$ in the reaction zone must be sufficient to react with the lead contaminants and accordingly this exact amount will depend on the amount of lead in the exhaust gas. Accordingly, a slight excess over the stoichiometric amount of $SO_2$ required to react with the lead contaminants is preferred. In an automotive exhaust gas combustion application this would translate typically into $SO_2$ concentrations in the exhaust 9as ranging from about 10 ppm to about 50 ppm by volume. In order to more fully illustrate the advantages to be derived from the instant invention the following examples are set forth. It is to be understood that the examples are only by way of illustration and are not intended as an undue limitation on the broad scope of the invention as set forth in the appended claims.

EXAMPLE I

This example is a comparison of the performance of the catalyst composition of the present invention comprising a catalyst having a platinum component on alumina with a protective layer of titania thereover compared to a catalyst of the prior art comprising platinum on alumina. The comparison was made in connection with the use of leaded fuel.

Both catalysts were tested for oxidation activity in an engine dynamometer test. The oxidation activity test consisted of a measure of the sustained performance (the percent conversion of oxidizable compounds in the exhaust gas) at two different operating regimes. These operating regimes simulate an acceleration condition and a cruise condition for an internal combustion engine. Table I below sets out the test conditions for the dynamometer test described below.

TABLE I

| Test Conditions | Acceleration | Cruise |
| --- | --- | --- |
| % CO | 2.0 | 0.2 |
| % $O_2$ | 4.8 | 5.3 |
| A/F | 17/1 | 19/1 |
| Inlet Temperature, °F. | 700 | 700 |
| Fuel Concentrations/Liter | | |
| 0.150 grams Pb | | |
| 0.001 grams P - Tricresyl phosphate | | |
| 250 wt. ppm Sulfur-Tetrahydrothiophene | | |
| ~10-15 ppm $SO_2$ in the exhaust gas | | |

Prior to carrying out the above-described oxidation test the catalysts were both aged for about 50 hours in an aging cycle designed to simulate vehicle aging of catalytic composites in a high lead content environment. The aging cycle consists of four operating modes. Table II below elucidates the conditions employed in the aging cycle.

TABLE II

| | AGING CYCLE | | | |
| --- | --- | --- | --- | --- |
| Mode | 1 | 2 | 3 | 4 |
| Inlet Temp. °F. | 875 ± 25 | 1400 ± 25 | 1650 ± 50 | 1050 ± 50 |
| Inlet CO (%) | 0.19 | 0.17 | 2.24 | 0.27 |
| Inlet $O_2$ (%) | 1.35 | 2.00 | 0.11 | 1.25 |
| Mode Time (Min.) | 6 | 22 | 2 | 30 |

Aging Fuel: Indolene containing 570 mg Pb/gal, 4 mg P/gal, 250 wt. ppm S.

To illustrate the favorable lead-tolerant feature of the catalyst of the present invention over that of the conventional catalyst comprising platinum on alumina the following composites were prepared. The conventional catalyst comprising platinum on alumina was prepared by the following method. 400 g of gamma-alumina were impregnated with 12.576 g of chloroplatinic acid solution (28.76% platinum) in excess water (1500 ml). The platinum impregnated gamma-alumina was subsequently dried at 100° C. in a rotary evaporator. After drying the platinum impregnated gamma-alumina was calcined for 1 hour at 1000° F. in a direct fired furnace. After calcination the platinum impregnated alumina was subjected to a reduction step at 500° C. for 1 hour in a mixture of about 10% hydrogen and 90% nitrogen and for about 2 hours at the same conditions with 100% hydrogen. The reduced platinum impregnated alumina was then slurried with 667 g of deionized water and 25 g of concentrated $HNO_3$. The resulting mixture was ballmilled for 3 hours. A 2.66 inch diameter by 3 inch long cordierite monolith having about 400 channels per square inch of circular face was dipped into the above-described slurry. After dipping the monolith was subjected to a blow-out step to remove excess slurry from the channels. A monolith was subsequently calcined for about 1 hour at 1000° F. The above-described dipping, calcining and blow-out steps were repeated until the monolith contained about 25 g of platinum per cubic foot of monolith dimension. The resulting catalytic monolith was then implaced within an oxidation reaction zone and the entire system was designated Catalyst A.

A catalyst in accordance with the present invention comprising platinum on alumina supported on a monolithic structure with a protective overcoat of titania was then prepared by the following method. 400 g of gamma-alumina were impregnated with 12.576 9 of chloroplatinic acid solution (28.76% platinum) in excess water (1500 ml). The platinum impregnated gamma-alumina was subsequently dried at 100° C. in a rotary evaporator. After drying, the platinum impregnated gamma-alumina was calcined for 1 hour at 1000° F. in a direct fired furnace. After calcination the platinum impregnated alumina was subjected to a reduction step at 500° C. for 1 hour in a mixture of about 10% hydrogen and 90% nitrogen and for about 2 hours at the same condition with 100% hydrogen. The reduced platinum impregnated alumina was then slurried with 667 g of deionized water and 25 g of concentrated $HNO_3$. The resulting mixture was ball-milled for 3 hours. A 2.66 inch diameter by 3 inch long cordierite monolith having about 400 channels per square inch of circular face was dipped into the above-described slurry. After dipping the monolith was subjected to a blow-out step to remove excess slurry from the channels. The monolith was subsequently calcined for about 1 hour at 1000° F. The above-described dipping, calcining and blow-out steps were repeated until the monolith contained about 25 g of platinum per cubic foot of monolith dimension. 192 g of titania were slurried with 480 g of deionized water and 1.5 g of concentrated $HNO_3$. The slurry was then ball-milled for about 3 hours. The cordierite monolith containing platinum on alumina was then dipped in the titania containing slurry. The dipped monolith was thereafter subjected to a blow-out step to remove excess slurry. The dipping and blow-out steps were repeated until the monolith contained about 778 g of titania per cubic foot of monolith dimension. The resulting catalytic monolith was then subjected to a calcination step for 1 hour at 1000° F. This calcined catalytic monolith was designated Catalyst B.

As previously indicated, both Catalysts A and B were subjected to a 50 hour aging cycle designed to simulate vehicle aging of oxidation catalysts in a high lead content environment. The conditions during this aging cycle were the same as set out in Table II above. After the aging cycle the catalysts were both subjected to the dynamometer test described above in Table I. The hydrocarbon and carbon monoxide oxidization conversions were measured. As previously noted, the conversions were measured at acceleration and cruise conditions. The results of the testing are set forth in Table III below. The abbreviation "HC Accel." indicates the hydrocarbon oxidation conversion in the acceleration mode and the abbreviation "CO Accel." indicates the carbon monoxide oxidation conversion in the acceleration mode. The abbreviation "HC Cruise" indicates the hydrocarbon oxidation conversion in the cruising mode and the abbreviation "CO Cruise" indicates the carbon monoxide oxidation conversion in the cruise mode.

TABLE III

| Evaluation Mode | Catalyst A | Catalyst B |
| --- | --- | --- |
| HC Accel. | 21.7 | 42.7 |
| CO Accel. | 73.1 | 86.5 |
| HC Cruise | 61.2 | 64.0 |
| CO Cruise | 85.1 | 87.9 |

50 Hrs. Aging

As can be seen from the data set forth in Table III above Catalyst B of the present invention demonstrates improved lead resistance. The result is particularly striking for the acceleration mode. For example, after 50 hours of aging in a leaded environment Catalyst B shows a much higher hydrocarbon oxidation conversion in the acceleration mode than does Catalyst A. Likewise, the carbon monoxide oxidation conversion exhibited by Catalyst B in the acceleration mode is much greater than that exhibited by Catalyst A. Although in the cruise mode the difference in performance of the catalysts is not as marked, Catalyst B still exhibits higher conversions than Catalyst A. Accordingly, it can be seen that Catalyst B of the present invention is more lead-tolerant than Catalyst A.

EXAMPLE II

In order to determine the long term lead-tolerant characteristics of the catalyst system of the invention, a further comparative test was performed. In this example the dynamometer test employed to evaluate the catalyst was substantially the same as that set forth in Table I above. However, in this test in order to simulate long term exposure to lead, the catalysts tested in this example were subjected to 200 hours of aging. The aging cycle employed in this example is set forth in Table IV below.

TABLE IV

| MODE | AGING CYCLE | | |
|---|---|---|---|
| | 1 | 2 | 3 |
| Inlet Temp. °F. | 850 ± 25 | 1400 ± 25 | 1100 ± 100 |
| Inlet CO (%) | 0.1–0.2 | 0.1–0.3 | 0.1–0.2 |
| Inlet $O_2$ (%) | 2 ± 0.5 | 1.5 ± 0.5 | 2.0 ± 0.5 |

Aging Fuel: Indolene containing 570 mg Pb/gal, 4 mg P/gal, 250 wt. ppm S.

For this example a second conventional catalyst comprising platinum on alumina supported on a monolithic structure was prepared. The method employed in preparing this catalyst was the same as that employed for preparing Catalyst A of Example I. This second conventional catalyst was designated Catalyst C.

A fourth catalyst was prepared in substantially the same manner as Catalyst B set forth in Example I. This catalyst was designated Catalyst D.

As indicated above, in order to simulate long term exposure to lead, Catalysts C and D of this example were subjected to 200 hours of aging. The aging cycle employed was that set forth in Table IV above. The dynamometer test employed to evaluate these catalysts was identical to the test set forth in Table I of Example 1. The results of the dynamometer test are set forth in Table V below.

TABLE V

| Evaluation Mode | Catalyst C | Catalyst D |
|---|---|---|
| HC Accel. | 12.8 | 15.9 |
| CO Accel. | 28.0 | 41.5 |
| HC Cruise | 21.4 | 35.5 |
| CO Cruise | 44.0 | 58.8 |

200 Hrs. Aging

As can be seen from the data set forth in Table V Catalyst D of the present invention exhibited substantially improved lead-tolerance to that of the conventional catalyst. Catalyst D exhibited superior conversion of hydrocarbons and carbon monoxide in the acceleration mode and in the cruise mode over Catalyst C. Accordingly, it can be seen that the catalyst of the present invention has improved lead tolerance over the catalysts of the prior art when the catalyst of the present invention is subjected to long term lead exposure.

EXAMPLE III

This example is a comparison of the performance of a catalyst having a platinum component on alumina (Catalyst E) and a catalyst having platinum on alumina with a protective coat of alumina thereover (Catalyst F). The comparison was made in connection with the use of leaded fuel.

The two catalysts were tested for oxidation activity in an engine dynamometer test. The oxidation activity test consisted of a measure of the sustained performance (the percent conversion of oxidizable compounds in the exhaust gas) at two different operating regimes. These operating regimes simulate an acceleration condition and a cruise condition for an internal combustion engine. Table VI below sets out the test conditions for the dynamometer test described below.

TABLE VI

| Test Conditions | Acceleration | Cruise |
|---|---|---|
| % CO | 2.0 | 0.2 |
| % $O_2$ | 4.8 | 5.3 |
| A/F Ratio | 17/1 | 19/1 |
| Inlet Temperature, °F. | 700 | 700 |
| Fuel Concentrations/liter | | |
| .15 grams Pb | | |
| 1 milligrams P | | |
| 200 ppm Sulfur-Tetrahydrothiophene | | |

Prior to carrying of the above-described oxidation test the catalytic composites were aged for 300 hours in aging cycle designed to simulate vehicle aging of oxidation catalysts in a high lead content environment. The aging cycle consists of idle, cruise, and high cruise modes of operation. Table VII below elucidates the conditions employed in the aging sequence.

TABLE VII

| | AGING CYCLE | | |
|---|---|---|---|
| Inlet Temperature (°F.) | 850 ± 25 | 1400 ± 25 | 1100 ± 100 |
| Inlet CO (%) | 0.1–0.2 | 0.1–0.3 | 0.1–0.2 |
| Inlet $O_2$ (%) | 2 ± 0.5 | 1.5 ± 0.5 | 2.0 ± 0.5 |

Aging Fuel: Indolene Containing 570 mg Pb/gal., 4 mg P/gal., 250 wt. ppm S

The platinum on alumina supported catalyst was prepared by impregnating 300 g of gamma-alumina with 3.74 g of chloroplatinic acid solution (28.9 wt. % Pt) in excess water (1600 ml). The platinum-impregnated gamma-alumina was subsequently dried at about 100° C. in a rotary evaporator. After the drying steps, the platinum-impregnated gamma-alumina was calcined for 1 hour at 1000° F. in a direct fired furnace. The calcination step was followed by a reduction step at 500° C. in an $H_2$ atmosphere for 2 hours. The 300 g of platinum-impregnated alumina was slurried with 500 g of $H_2O$ and 19 g of concentrated $HNO_3$ ball-milled for 2 hours. A 2.66 inch in diameter, 3 inch long 300 channel per square inch cordierite monolith was dipped into the above-described slurry followed by a blowout of the excess slurry. The monolith was subsequently calcined for 1 hour at 1000° F. The above dipping and calcining steps were repeated until the catalytic composite contained 10 g platinum per cubic foot which was equivalent to a total washcoat loading of 2782 g/ft³. This alumina-washcoat catalyst designated Catalyst E was substantially similar to the alumina washcoat Catalysts A and C employed in Examples I and II except that the monolith channel densities of Catalysts A and C were 400 channels per square inch while that of Catalyst E was 300 channels per square inch and that Catalysts A and C contained 25 g platinum per cubic foot while Catalyst E contained 10 g platinum per cubic foot.

Catalyst F was prepared exactly as Catalyst E except that the platinum loading was achieved by use of 3.02 g of chloroplatinic acid solution (28.89 wt. % Pt) per 150 g of alumina. The alumina loading of the washcoat was carried out such that the alumina content was about 0.6 times that of Catalyst E, about 1900 g/ft$^3$. In order to deposit the protective overcoat of alumina over the platinum on alumina washcoat, 300 g of gamma-alumina were slurried with 500 g of water, 12 g of concentrated HNO$_3$. This slurry was ball-milled for 2 hours. The above washcoated monolith was dipped into the slurry with the excess slurry blown out to provide the overcoat. The dipped monolith was thereafter calcined for 1 hour at 1000° F. The dipping and calcining steps were repeated until the total alumina loading, washcoat plus protective overcoat was the same as that of Catalyst E, about 2800 g/ft$^3$. Catalyst F also contained 10 g platinum per cubic foot.

The hydrocarbon and carbon monoxide oxidation conversions were measured after the above-described 300 hour aging cycle. The conversions were measured at acceleration and cruise conditions. "HC Accel." and "HC Cruise" denote conversion of hydrocarbons at acceleration conditions and cruise conditions, respectively. "CO Accel." and "CO Cruise" denote conversion of CO at acceleration and cruise conditions, respectively. Table VIII below sets out the results obtained.

TABLE VIII

|  | Catalyst E | Catalyst F |
|---|---|---|
| HC Accel. | 63 | 53 |
| CO Accel. | 97 | 90 |
| HC Cruise | 64 | 67 |
| CO Cruise | 90 | 90 |

As the data in Table VIII indicates, Catalyst E, with the exception of the conversion of HC under cruise conditions, exhibits better or equal conversion than Catalyst F. Thus, Catalyst E has an improved tolerance for lead poisoning over Catalyst F under the conditions illustrated.

The results of Example III may also be compared to the results of Examples I and II to illustrate the superiority of the coating of the present invention. In the latter examples, a catalyst comprising platinum on alumina was compared to the catalyst of the present invention comprising platinum on alumina with a titania overcoat at different aging periods of 50 hrs. and 200 hrs. The results illustrated the improvement in lead tolerance by the catalysts of the present invention containing a titanium overcoat (B and D) over those catalysts comprising platinum on alumina (A and C). Example III, on the other hand, indicates that a catalyst comprising platinum on alumina (E) is more lead tolerant than a catalyst comprising platinum on alumina containing an alumina overcoat (F). A qualitative comparison of the results of Example III to those of Examples I and II clearly indicate that the catalyst of the present invention is more lead tolerant than a catalyst comprising platinum on alumina which, in turn, is more lead tolerant than a catalyst comprising platinum on alumina containing an alumina overcoat. It is believed that the difference between the monolith channel density of the catalysts of Example III and those of Examples I and II do not substantially impair the comparison.

I claim:

1. A lead-tolerant exhaust gas oxidation catalytic composite for oxidizing exhaust gas in the presence of SO$_2$ comprising a single layer of refractory inorganic oxide support material having deposited thereon a noble metal component and having dispersed immediately thereover a protective coating of titania.

2. The catalytic composite of claim 1 further characterized in that the refractory oxide support comprises alumina.

3. The catalytic composite of claim 1 characterized in that the noble component comprises platinum.

4. The catalytic composite of claim 1 characterized in that it comprises a noble metal component on a refractory oxide support material washcoat with a titania washcoat superimposed thereover, both washcoats supported on a low surface area support matrix.

5. The catalytic composite of claim 4 characterized in that it contains from about 10 grams to 100 grams per cubic foot of support matrix.

6. The catalytic composite of claim 4 characterized in that it contains from about 400 grams to 10,000 grams of titania per cubic foot of support matrix.

7. The catalytic composite of claim 4 characterized in that each of the washcoats has a thickness of from about 0.0003 inches to 0.01 inch.

8. The catalytic composite of claim 4 characterized in that said low surface area support matrix comprises a honeycomb type ceramic or metallic carrier.

9. The catalytic composite of claim 1 characterized in that it comprises pellets.

10. The catalytic composite of claim 1 characterized in that the pellets comprise from about 0.1 to 4 wt. % of noble metal based on the weight of the refractory inorganic oxide.

* * * * *